United States Patent
Salter et al.

(10) Patent No.: US 10,011,219 B2
(45) Date of Patent: Jul. 3, 2018

(54) ILLUMINATED BADGE

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 14/997,711

(22) Filed: Jan. 18, 2016

(65) Prior Publication Data

US 2017/0203686 A1 Jul. 20, 2017

(51) Int. Cl.
| | |
|---|---|
| *B60Q 1/56* | (2006.01) |
| *G09F 21/04* | (2006.01) |
| *B60R 13/00* | (2006.01) |
| *F21V 9/16* | (2006.01) |
| *F21V 7/00* | (2006.01) |
| *F21V 9/30* | (2018.01) |
| *F21V 7/04* | (2006.01) |
| *F21Y 115/10* | (2016.01) |

(52) U.S. Cl.
CPC .............. *B60Q 1/56* (2013.01); *B60R 13/005* (2013.01); *F21V 7/00* (2013.01); *F21V 9/16* (2013.01); *F21V 9/30* (2018.02); *G09F 21/04* (2013.01); *B60Q 2400/20* (2013.01); *F21Y 2115/10* (2016.08)

(58) Field of Classification Search
CPC ........... B60Q 1/56; B60R 13/005; F21V 7/00; F21V 9/16; G09F 21/04
See application file for complete search history.

(56) References Cited

U.S. PATENT DOCUMENTS

| | | | |
|---|---|---|---|
| 2,486,859 | A | 11/1949 | Meijer et al. |
| 4,745,525 | A | 5/1988 | Sheehy |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 5,874,894 | A | 2/1999 | Heller |
| 6,031,511 | A | 2/2000 | DeLuca et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Anh Mai
*Assistant Examiner* — Nathaniel Lee
(74) *Attorney, Agent, or Firm* — Jason Rogers; Price Heneveld LLP

(57) ABSTRACT

A vehicle is provided herein. The vehicle includes a body panel and a badge attached to the panel. The badge includes a substrate and a housing attached thereto that define a cavity therebetween. A reflective member is disposed within the cavity. A light source is disposed within the cavity and is configured to emit excitation light in a first direction to illuminate a viewable portion of the badge and in a second direction towards the reflective member. The reflective member redirects the light through a peripheral portion of the badge.

19 Claims, 13 Drawing Sheets

(56) References Cited

U.S. PATENT DOCUMENTS

| | | | |
|---|---|---|---|
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,931,393 B2 | 4/2011 | Stempinski |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 * | 1/2014 | Li ..................... G09F 13/20 362/293 |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0164796 A1 * | 6/2012 | Lowenthal ............ H01L 25/048 438/127 |
| 2012/0183677 A1 | 7/2012 | Agrawal et al. |
| 2012/0256543 A1 | 10/2012 | Marcove et al. |
| 2012/0280528 A1 | 11/2012 | Dellock et al. |
| 2013/0039083 A1 * | 2/2013 | Gong ..................... B60R 13/10 362/511 |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014136598 A1 | 9/2014 |
| WO | 2014161927 A1 | 10/2014 |

* cited by examiner

US 10,011,219 B2

ILLUMINATED BADGE

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle is disclosed. The vehicle includes a body panel. A badge is attached to the panel and includes a substrate and a housing attached thereto. A cavity is disposed between the substrate and housing. A reflective member is disposed within the cavity. A light source is disposed within the cavity and configured to emit an excitation light in a first direction to illuminate a viewable portion of the badge and in a second direction towards the reflective member. The reflective member redirects the excitation light through a peripheral portion of the badge.

According to another aspect of the present invention, a badge is disclosed. The badge includes a housing that is attached to a substrate to form a viewable front portion, a peripheral portion, and a rear portion. A cavity is disposed between the housing and substrate and has a light source therein. A first photoluminescent structure is disposed between the light source and housing and configured to emit a converted light in response to an excitation light emitted from the light source. The converted light exits the housing through a light transmissive portion.

According to yet another aspect of the present invention, A badge for a vehicle is disclosed. The badge includes a rear portion, a peripheral portion, and a viewable front portion. A light-producing assembly is disposed within the peripheral portion and is configured to emit an excitation light in two opposing directions. A first photoluminescent structure is disposed over a portion of the light-producing assembly and is configured to emit a converted light in response to the excitation light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
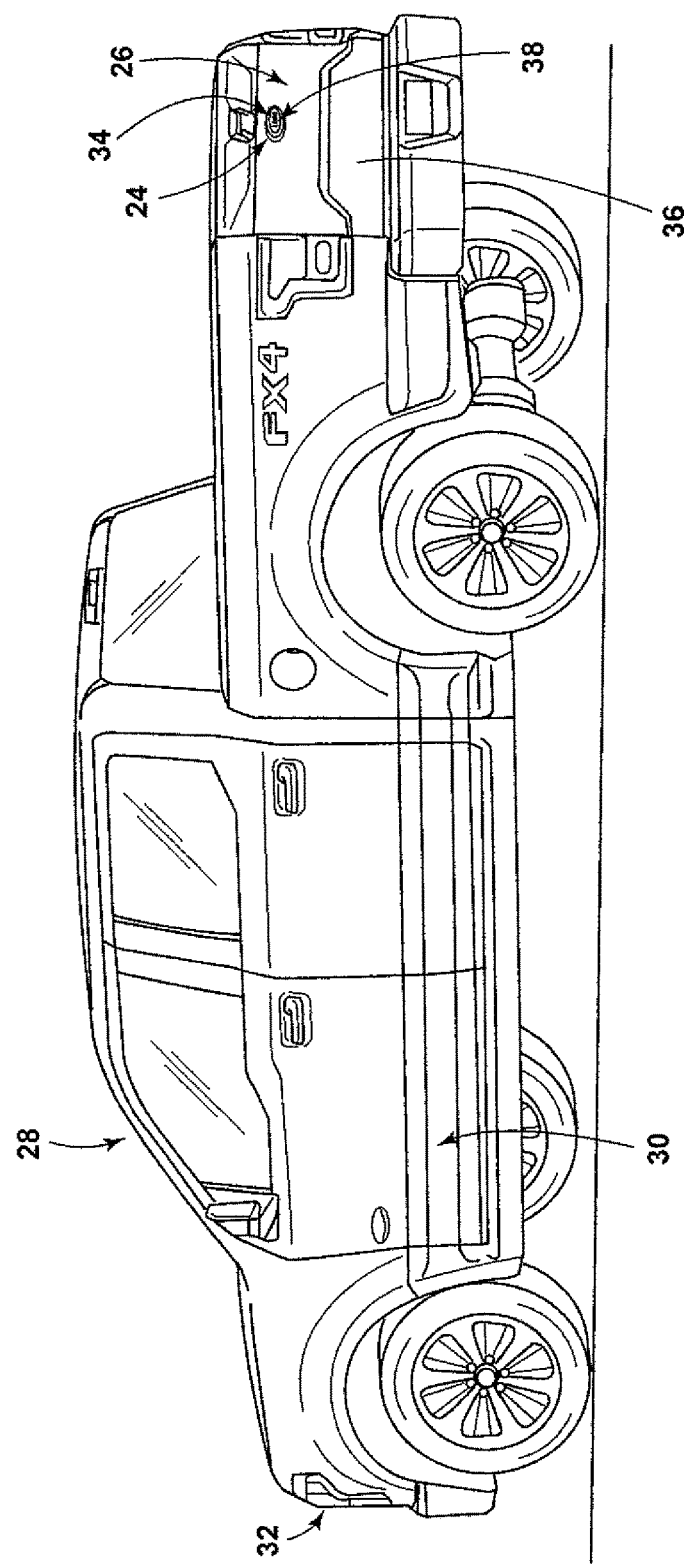
FIG. 2 is a perspective view of a vehicle equipped with an illuminated badge on a tailgate of the vehicle, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge for a vehicle. The badge may advantageously employ one or more photoluminescent structures that illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Figure 1A:
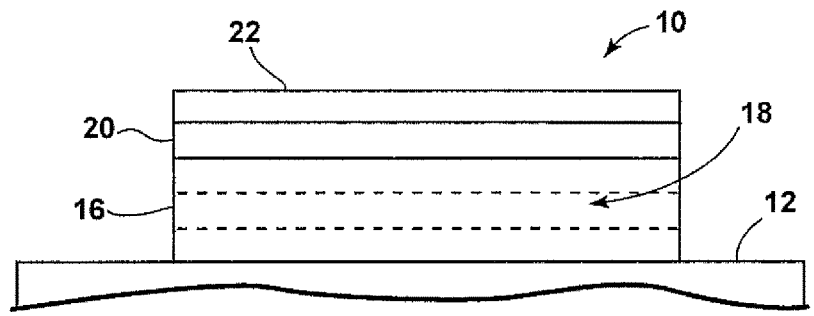
FIG. 1A is a side view of a photoluminescent structure rendered as a coating for use in a vehicle badge according to one embodiment.
Figure 1B:
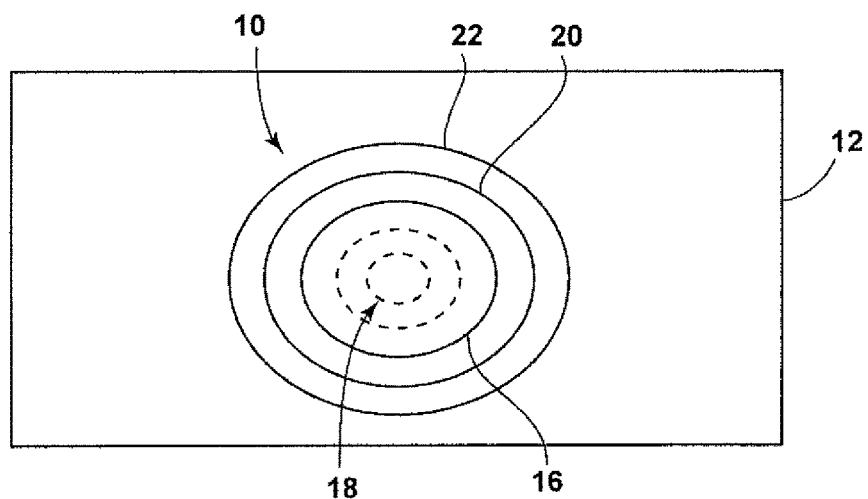
FIG. 1B is a top view of a photoluminescent structure rendered as a discrete particle according to one embodiment.
Figure 1C:
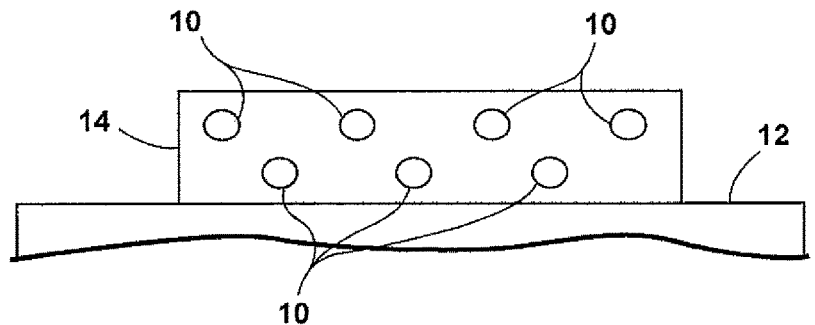
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 18 having energy converting elements with phosphorescent or fluorescent properties. Each photoluminescent material 18 may become excited upon receiving light of a specific wavelength, thereby causing the light to undergo a conversion process. Under the principle of down conversion, an excitation light 76 (FIG. 8) is converted into a longer wavelength converted light 78 (FIG. 8) that is outputted from the photoluminescent structure 10. Conversely, under the principle of up conversion, the excitation light 76 is converted into a shorter wavelength converted light 78 that is outputted from the photoluminescent structure 10. When multiple distinct wavelengths of light are outputted from the photoluminescent structure 10 at the same time, the wavelengths of light may mix together and be expressed as a multicolor emitted light 74 (FIG. 5B).

Light emitted by a light source is referred to herein as excitation light 76 and is illustrated herein as solid arrows. In contrast, light emitted from the photoluminescent structure 10 is referred to herein as converted light 78 and is illustrated herein as broken arrows. The mixture of excitation light 76 and converted light 78 that may be emitted simultaneously is referred to herein as emitted light 74.

In some embodiments, converted light 78 that has been down converted or up converted may be used to excite other photoluminescent material(s) 18 found in the energy conversion layer 16. The process of using converted light 78 outputted from one photoluminescent material 18 to excite another, and so on, is generally known as an energy cascade and may serve as an alternative for achieving various color expressions. With respect to either conversion principle, the difference in wavelength between the excitation light 76 and the converted light 78 is known as the Stokes shift and serves as the principle driving mechanism for an energy conversion process corresponding to a change in wavelength of light. In the various implementations discussed herein, each of the photoluminescent structures 10 may operate under either conversion principle.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier medium and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC photoluminescent COMPOSITIONS AND TEXTILES," filed Dec. 19, 2013, all of which are incorporated herein by reference in their entirety.

The photoluminescent structure 10, according to one embodiment, may include a persistent photoluminescent material 18 that emits converted light 78, once charged by the excitation light 76, that is emitted from an excitation source (e.g., any natural and/or artificial light source). The persistent photoluminescent material 18 may be defined as being able to store an excitation light 76 and release converted light 78 gradually, for a period of several minutes or hours, once the excitation light 76 is no longer present. The decay time may be defined as the time between the end of excitation from the excitation light 76 and the moment when the light intensity of the converted light 78 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

The persistent photoluminescent material 18, according to one embodiment, may be operable to emit light at or above an intensity of 0.32 mcd/m² after a period of 10 minutes. Additionally, the persistent photoluminescent material 18 may be operable to emit light above or at an intensity of 0.32 mcd/m² after a period of 30 minutes and, in some embodiments, for a period substantially longer than 60 minutes (e.g., the period may extend 8 hours or longer). Accordingly, the persistent photoluminescent material 18 may continually illuminate in response to excitation through a plurality of excitation sources emitting an excitation light 76, including, but not limited to, natural light (e.g., the sun) and/or any artificial light source. The periodic absorption of the excitation light 76 from any excitation source may provide for a substantially sustained charge of the persistent photoluminescent materials 18 to provide for consistent passive illumination. In some embodiments, a light sensor may monitor the illumination intensity of the photoluminescent structure 10 and initiate an excitation source when the illumination intensity falls below 0.32 mcd/m², or any other predefined intensity level.

The persistent photoluminescent materials 18 may correspond to alkaline earth aluminates and silicates, for example doped di-silicates, or any other compound that is capable of emitting light for a period of time once an excitation light 76 is no longer present. The persistent photoluminescent materials 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 76 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from an excitation light 76 and d-d transitions of $Mn^{2+}$ ions.

According to an alternate non-limiting exemplary embodiment, 100 parts of a commercial solvent-borne polyurethane, such as Mace resin 107-268, having 50% solid polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistent phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSIS- TENT LUMINESCENCE," issued Feb. 10, 2015, all of which are incorporated herein by reference in their entirety.

Referring now to FIG. 2, a badge 24 is generally shown mounted on a rear portion 26 of a vehicle 28. In other embodiments, the badge 24 may be located elsewhere, such as, but not limited to, other locations of the rear portion 26, a side portion 30, or a front portion 32 of the vehicle 28. Alternatively, the badge 24 may be disposed inside the vehicle 28. The badge 24 may be configured as an insignia that is presented as an identifying mark of a vehicle manufacturer and includes a viewable portion 34 that is generally prominently displayed on the vehicle 28. In the presently illustrated embodiment, the badge 24 is located on a tailgate 36 of the vehicle 28, thus allowing the badge 24 to be readily viewed by an observer looking at the rear portion 26 of the vehicle 28. As will be described below in greater detail, one or more light sources 38 may be disposed within the badge 24 and may illuminate in a plurality of manners to provide a distinct styling element to the vehicle 28.

Figure 3:
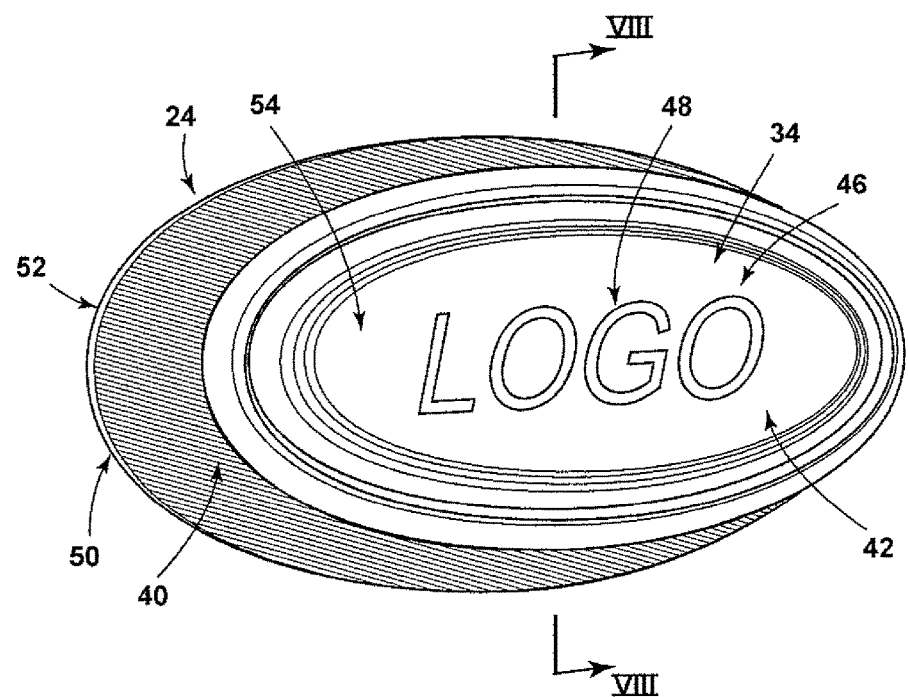
FIG. 3 is a front perspective view of the badge, according to one embodiment.

Referring to FIG. 3, the badge 24 is shown, according to one embodiment, having a housing 40 that includes the viewable portion 34 centrally located on a forward portion 42 thereof. The viewable portion 34 may include a background region 46 and indicia 48. The indicia 48 may signify the make, model, or any other information that may be desirable to confer about the vehicle 28 upon which the badge 24 is attached to. Some portions of the badge 24 may include light transmissive portions that are made of a transparent and/or translucent material while other portions may be opaque, as will be described in greater detail below.

The badge 24 may also include a substrate 50 that may be attached to the housing 40. The substrate 50 may form a rear portion 52 of the badge. A peripheral portion 44 extends from the rear portion 52 of the badge 24. It will be understood that the peripheral portion 44, or any other portion described herein, may be integrally formed with any other components, or later attached thereto without departing from the teachings provided herein. For example, the peripheral portion 44 may be an independent component or integrally formed with the housing 40.

The substrate 50, or rear portion 52, may be capable of being secured to a vehicle 28. A cavity 54 may be disposed between the housing 40 and substrate 50. The cavity 54 may be hollow, may include additional components therein, and/or may be wholly filled in when the housing 40 and substrate 50 are attached to one another.

According to one embodiment, the housing 40 and/or the substrate 50 may be constructed from a rigid material such as, but not limited to, a polymeric material and may be assembled to one another via sonic welding, laser welding, vibration welding, injection molding, or any other process known in the art. Alternatively, the housing 40 and the substrate 50 may be assembled together via the utilization of adhesives. Alternatively still, the housing 40 and substrate 50 may be integrally formed as a single component.

Figure 4:
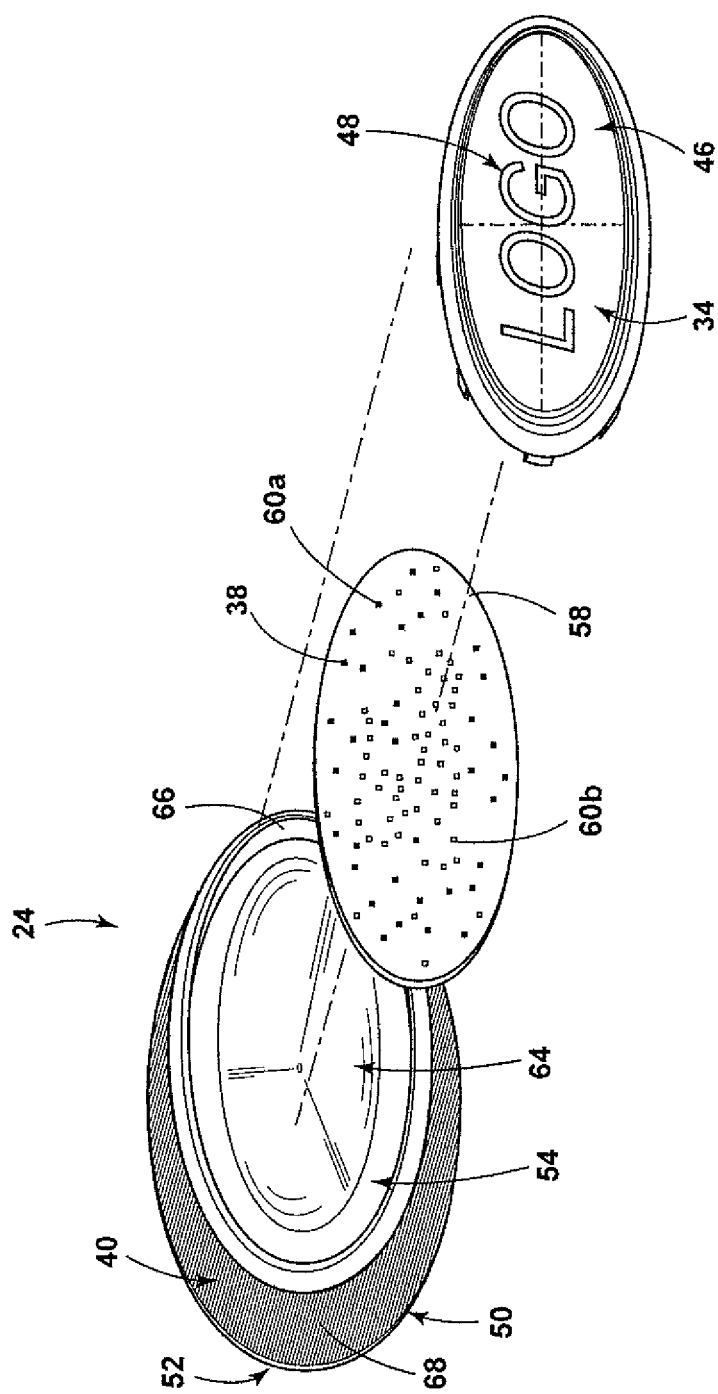
FIG. 4 is an exploded view of the badge having a light source therein that is configured to direct light in two opposing directions, according to one embodiment.

Referring to FIG. 4, an exploded view of the badge 24 is illustrated, according to one embodiment. The substrate 50 may have a reflective member 64 disposed thereon. The reflective member 64 may be integrally formed with the substrate 50, or later attached thereto through any process known in the art. It will be understood that the substrate 50 and reflective member 64 may be in any form and include any geometric orientation without departing from the teachings provided herein.

As illustrated in FIG. 4, the badge 24 includes a printed circuit board (PCB) 58 secured within the cavity 54 having the light source 38 disposed thereon. However, in alternate embodiments the light source 38 may be disposed on any other component without departing from the teachings provided herein.

The light source 38 may be oriented to direct light forwardly, rearwardly, or in both directions, from within the badge 24. The light source 38 may include any form of light source. For example, fluorescent lighting, light emitting diodes (LEDs), organic LEDs (OLEDs), polymer LEDs (PLEDs), solid state lighting, or any other form of lighting configured to emit light may be utilized.

With reference to FIG. 4, the light source 38 includes a first plurality of LED sources 60a disposed on the PCB 58 and orientated such the excitation light 76 outputted therefrom is directed towards the viewable portion 34. The first plurality of LED sources 60a may be configured to direct excitation light 76 towards the viewable portion 34 in a desired pattern.

Additionally, or alternatively, the light source 38 may include a second plurality of LED sources 60b disposed on the PCB 58 and configured to direct light away from the viewable portion 34 (i.e., toward the substrate 50). Excitation light 76 emitted from the second plurality of LED sources 60b may be directed towards the reflective member 64, which redirects the light through the peripheral portion 44 of the badge 24. Accordingly, the reflective member 64 may be of any practicable shape, such as conical, to direct light in a desired direction at a desired concentration.

Portions of the housing 40 and the substrate 50 that are readily visible (e.g., the peripheral portion 44 and viewable portion 34) may be colored any color or may be metalized. For example, a metallic layer may be applied to the peripheral portion 44 via partial vacuum deposition. According to an alternate embodiment, a metallic layer may be applied to any portion of the housing 40 or the substrate 50 via electroplating a thin layer of chromium thereon. Alternatively still, an imitator of chrome may be used for aesthetic purposes. The metallic layer or some portion thereof may be transparent and/or translucent to allow light to pass therethrough from an inner surface 66 to an outer surface 68.

Similarly, the indicia 48 disposed on the viewable portion 34 may also confer a metallic appearance. According to one embodiment, the indicia 48 may have a translucent metallic layer disposed thereon. Accordingly, the indicia 48 may illuminate when the first plurality of LED sources 60a is illuminated and confer a metallic appearance in the unilluminated state. The background region 46 may also be colored any desired color and/or incorporate a metallized finish on portions thereof. According to one embodiment, the background region 46 employs a translucent blue color thereby partially concealing the components of the badge 24 disposed rewardly of the viewable portion 34. Alternate processes may be used for coloring or layering material onto a portion of the housing 40 and/or the substrate 50, as known in the art without departing from the teachings provided herein.

Figure 5A:
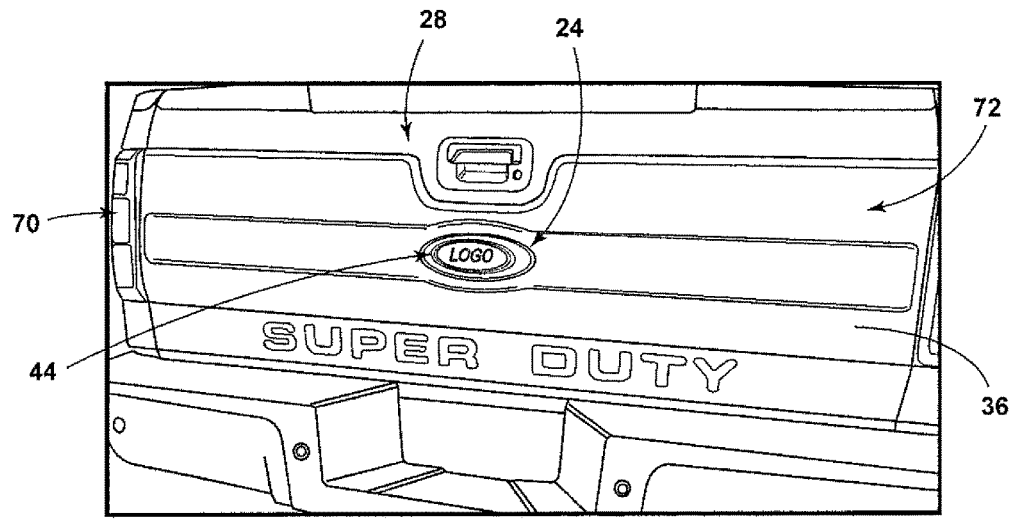
FIG. 5A is a perspective view of the tailgate having the badge in an unilluminated state.
Figure 5B:
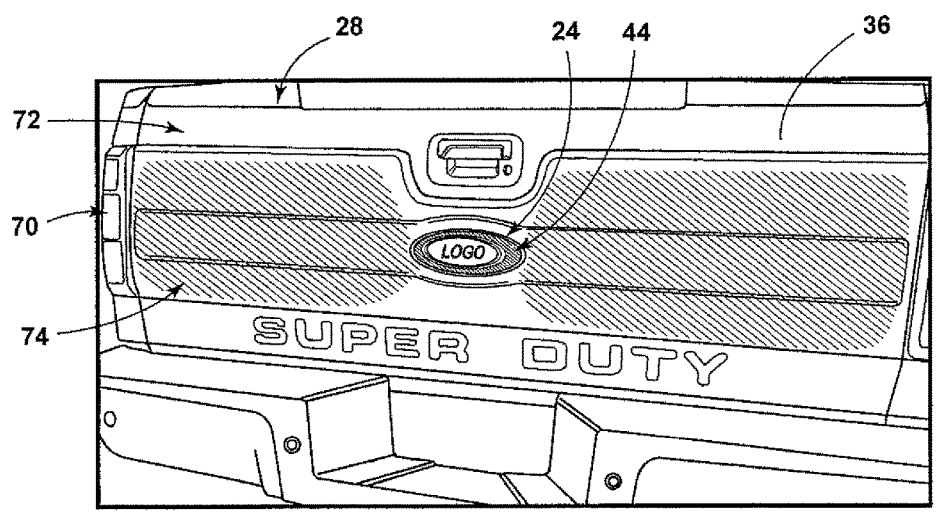
FIG. 5B is a perspective view of the tailgate having the badge in an illuminated state.

Referring to FIGS. 5A-5B, the badge 24 includes a controller 96 (FIG. 11) that is configured to illuminate the badge 24 in a plurality of illumination patterns. According to one embodiment, the badge 24 may communicate with a vehicle braking system such that the badge 24 illuminates in accordance with various lighting patterns that may be typical of a braking system. For example, as an occupant of the vehicle 28 initiates the vehicle braking system, the peripheral portion 44 may output emitted light 74 in conjunction with a brake light 70 disposed on the vehicle 28. Accordingly, the emitted light 74 emitted through the peripheral portion 44 may be red in color to match the light emitted from other vehicle brake lights 70.

Additionally, or alternatively, the indicia 48 may illuminate in a similar color to that of the peripheral portion 44 while the background region 46 illuminates in a second color. For example, the emitted light 74 of a first color (e.g., red) may exit through the peripheral portion 44 and the indicia 48 while the vehicle brakes 70 are initiated. Concurrently, the background region 46 may maintain a second, unique color (e.g., blue). It will be understood that this is just one exemplary embodiment and that one or more portion(s) of the badge 24 may illuminate in conjunction with any other portion of the badge 24 in a similar color while other portions of the badge 24 may illuminate in a second color simultaneously without departing from the teachings provided herein.

The emitted light 74 outputted through the peripheral portion 44 may be focused in any direction, such as towards a panel 72 of the vehicle 28 (e.g., the tailgate 36). The vehicle tailgate 36 may include a metallic and/or glossy finish to better reflect the light emitted through the peripheral portion 44. Moreover, the reflective member 64 (FIG. 4) with the badge 24 may be formed to direct emitted light 74 in varied concentrations towards predefined locations such that a substantial portion of the tailgate 36 and/or vehicle components proximately located to the badge 24 may become illuminated as the badge 24 directs emitted light 74 outwardly therefrom.

Figure 6:
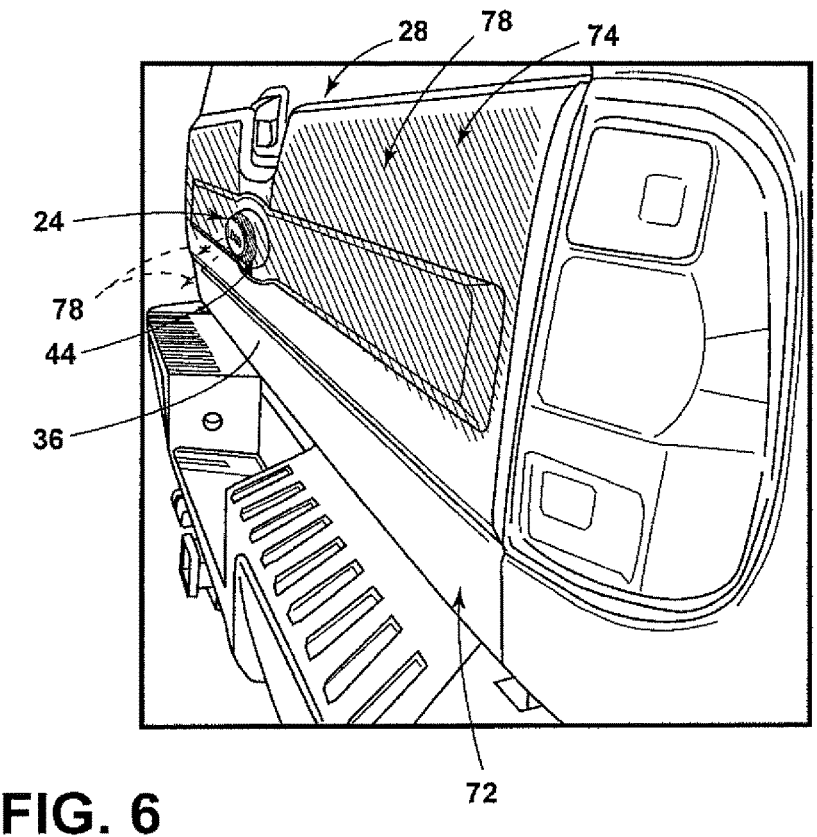
FIG. 6 is a partial side view of the vehicle having the illuminated badge attached to the tailgate.
Figure 7:
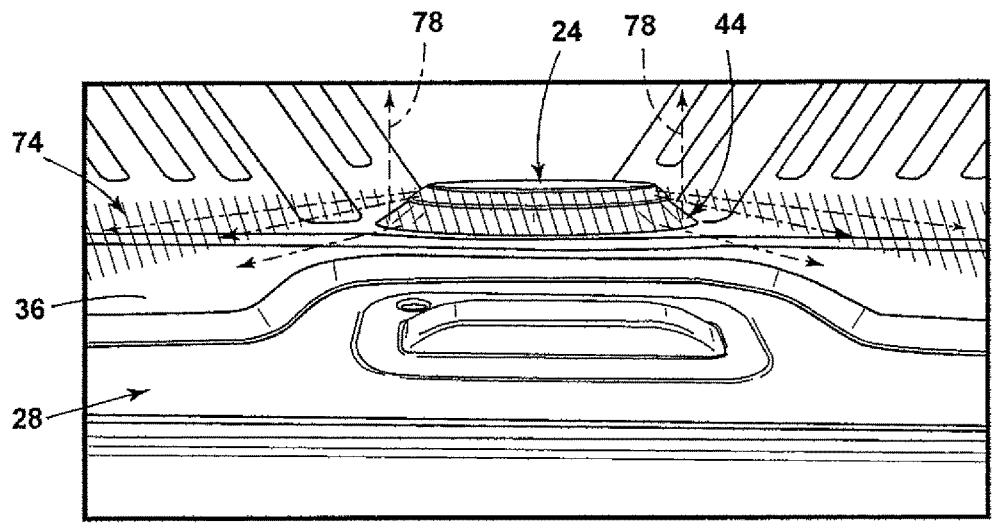
FIG. 7 is a partial top view of the tailgate having the badge attached thereto.

Referring to FIGS. 6 and 7, the emitted light 74 outputted through the peripheral portion 44 of the badge 24 may be directed along the tailgate 36, rearwardly from the vehicle 28, and/or a combination of both directions. According to one embodiment, converted light 78 directed through the peripheral portion 44 may be directed along the tailgate 36 of the vehicle 28. Additionally, or alternatively, the converted light 78 emitted through the peripheral portion 44 may be directed rearwardly of the vehicle 28. For example, a first portion of emitted light 74 emitted from the peripheral portion 44 may be directed rearwardly while a second portion may simultaneously be directed along the tailgate 36.

The reflective member 64 (FIG. 4) and/or optics may be utilized for directing various concentrations of emitted light 74 in a plurality of directions such that a desired location may be illuminated. As illustrated, more emitted light 74 is directed vehicle side-to-side than vertically to substantially match the rectangular orientation of the tailgate 36.

Figure 8:
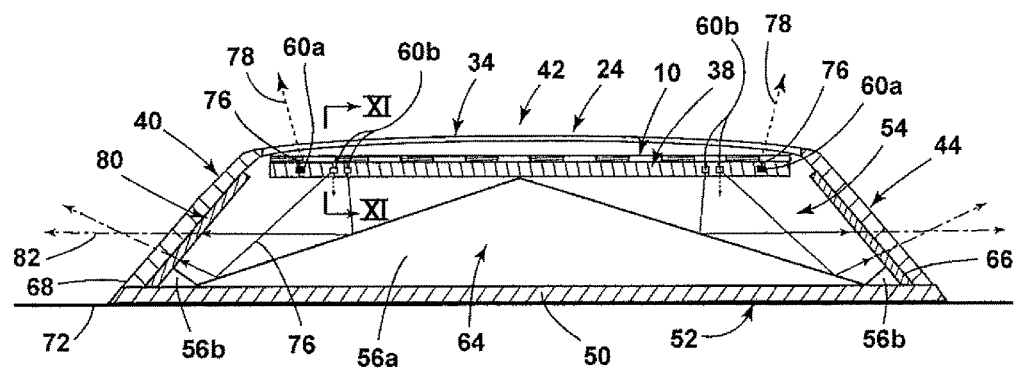
FIG. 8 is a cross-sectional view taken along the line VIII-VIII of FIG. 3 illustrating the badge having a centrally disposed reflective member and first and second photoluminescent structures disposed within a housing of the badge, according to one embodiment.

Referring to FIG. 8, a cross section of the badge 24 taken along the line VIII-VIII of FIG. 3 is illustrated, according to one embodiment. The badge 24 may be attached to the vehicle 28 through any means known in the art, including, but not limited to, the usage of fasteners or an adhesive layer between the substrate 50 and the tailgate 36. As illustrated in FIG. 8, the first plurality of LED sources 60a is orientated towards the viewable portion 34. A first photoluminescent structure 10 is disposed above the light source 38. The first photoluminescent structure 10 is configured to convert excitation light 76 emitted at a first wavelength from the first plurality of LED sources 60a to converted light 78 of a second wavelength, as described above. The first photoluminescent structure 10 may emit converted light 78 for any length of time depending on the photoluminescent material 18 chosen.

With further reference to FIG. 8, the second plurality of LED sources 60b may be configured to direct excitation light 76 towards the reflective member 64 within the badge 24. The reflective member 64 may redirect the excitation light 76 and/or converted light 78 through the peripheral portion 44. As illustrated, the reflective member 64 includes a central reflective portion 56a that is configured to direct light through the peripheral portion 44 and towards the panel 72 upon which the badge 24 is affixed. The reflective member 64 may also include a side portion(s) 56b that is configured to direct emitted light 74 through the peripheral portion 44 and towards the viewable portion 34.

A second photoluminescent structure 80 may be disposed on the inner surface 66 of the peripheral portion 44 that is configured to convert excitation light 76 of a first wavelength to converted light 82 of a different wavelength, which may be the same second wavelength as the first photoluminescent structure, or a third, unique wavelength.

The first and second plurality of LED sources 60a, 60b may be configured to emit a wavelength of light that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs. According to one embodiment, excitation light 76 emitted from the light source 38 is converted by the respective photoluminescent structure 10, 80 into light of a longer wavelength and outputted therefrom. The converted light 78, 82 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structures 10, 80 may be configured such that emitted light 74 (i.e., a mixture of the excitation light 76 and converted light 78) is capable of being expressed as unicolored or multicolored light.

According to one embodiment, the light source 38 is configured to emit blue light and the first photoluminescent structure 10 is configured to convert the blue light into a neutral white light having a color temperature of approximately 4000K to 5000K. The converted light 78 escapes from the badge 24 via the viewable portion 34, thereby causing the viewable portion 34 to glow. To obtain a uniform illumination of the viewable portion 34, the first plurality of LED sources 60a may be configured to emit non-focused (e.g., diffused) light inside the badge 24 to provide a substantially even distribution of light for exciting the first photoluminescent structure 10.

Likewise, according to one embodiment, the second photoluminescent structure 80 may be configured to convert blue light into a red light. The converted light 82 escapes from the badge 24 via the peripheral portion 44, thereby creating a wash light on the tailgate 36. To obtain a desired illumination pattern, the second plurality of LED sources 60b may be configured to direct light inside the badge 24 towards the reflective member 64 to provide an even distribution of light for exciting the second photoluminescent structure 80.

Figure 9:
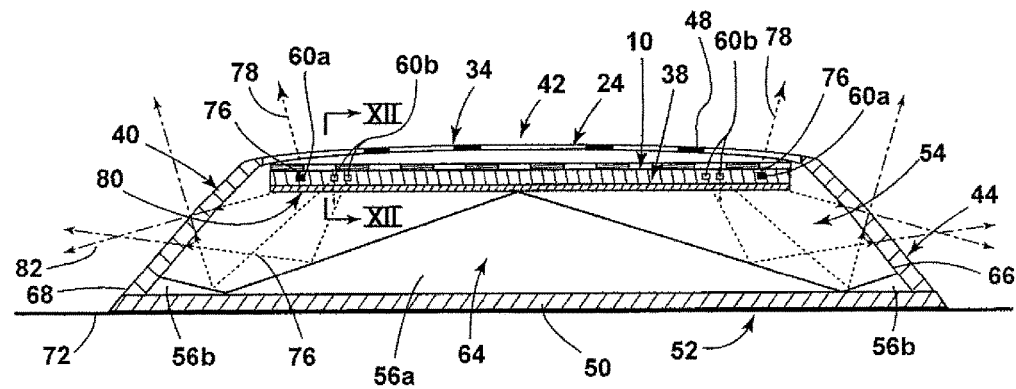
FIG. 9 is a cross-sectional view taken along the line VIII-VIII of FIG. 3 illustrating the badge having a centrally disposed reflective member and first and second photoluminescent structures disposed on opposing sides of the light source, according to an alternate embodiment.

Referring to FIG. 9, a cross section of the badge 24 taken along the line VIII-VIII of FIG. 3 is shown having similar components to that of the badge 24 illustrated in FIG. 8. However, as illustrated in FIG. 9, the second photoluminescent structure 80 may be applied over the second plurality of LED sources 60b. Accordingly, excitation light 76 emitted from the second plurality of LED sources 60b may become converted light 82 that is then redirected off of the reflective member 64 and through the peripheral portion 44 of the badge 24.

It should be appreciated that the second photoluminescent structure 80 may be disposed at any location between the second plurality of LED sources 60*b* and the outer surface 68 of the peripheral portion 44. For example, the second photoluminescent structure 80 may be disposed on the peripheral portion 44, the second plurality of LED sources 60*b*, the reflective member 64, and/or any other component within the badge 24 in alternate embodiments.

Figure 10:
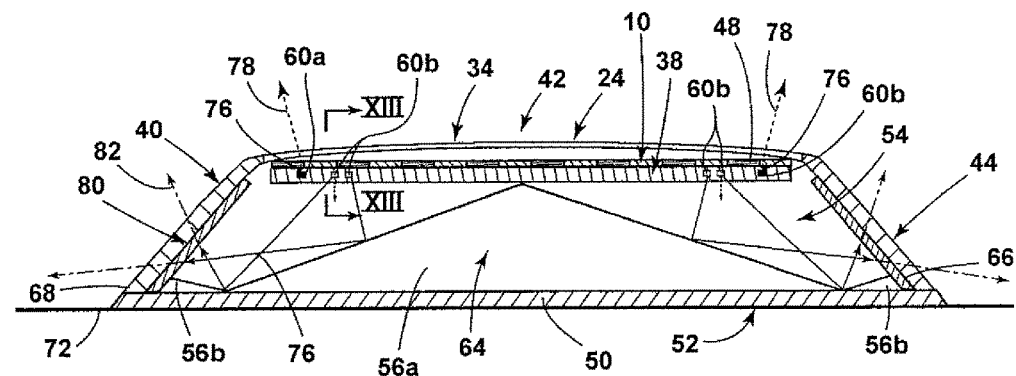
FIG. 10 is a cross-sectional view taken long the line VIII-VIII of FIG. 3 illustrating the badge having a centrally disposed reflective member and indicia disposed above the light source.

Referring to FIG. 10, a cross section of the badge 24 taken along the line VIII-VIII of FIG. 3 is shown having similar components to that of the badge 24 illustrated in FIG. 8. However, as illustrated in FIG. 10, the indicia 48 are disposed above the light source 38. The first photoluminescent structure may correspond to the indicia 48 such that the indicia 48 may illuminate in response to illumination of the first plurality of LED sources 60*a*. In alternate embodiments, the first photoluminescent structure 10 may correspond to the background region 46 such that the indicia 48 may be backlit when the first plurality of LED sources 60*a* is illuminated.

Figure 11:
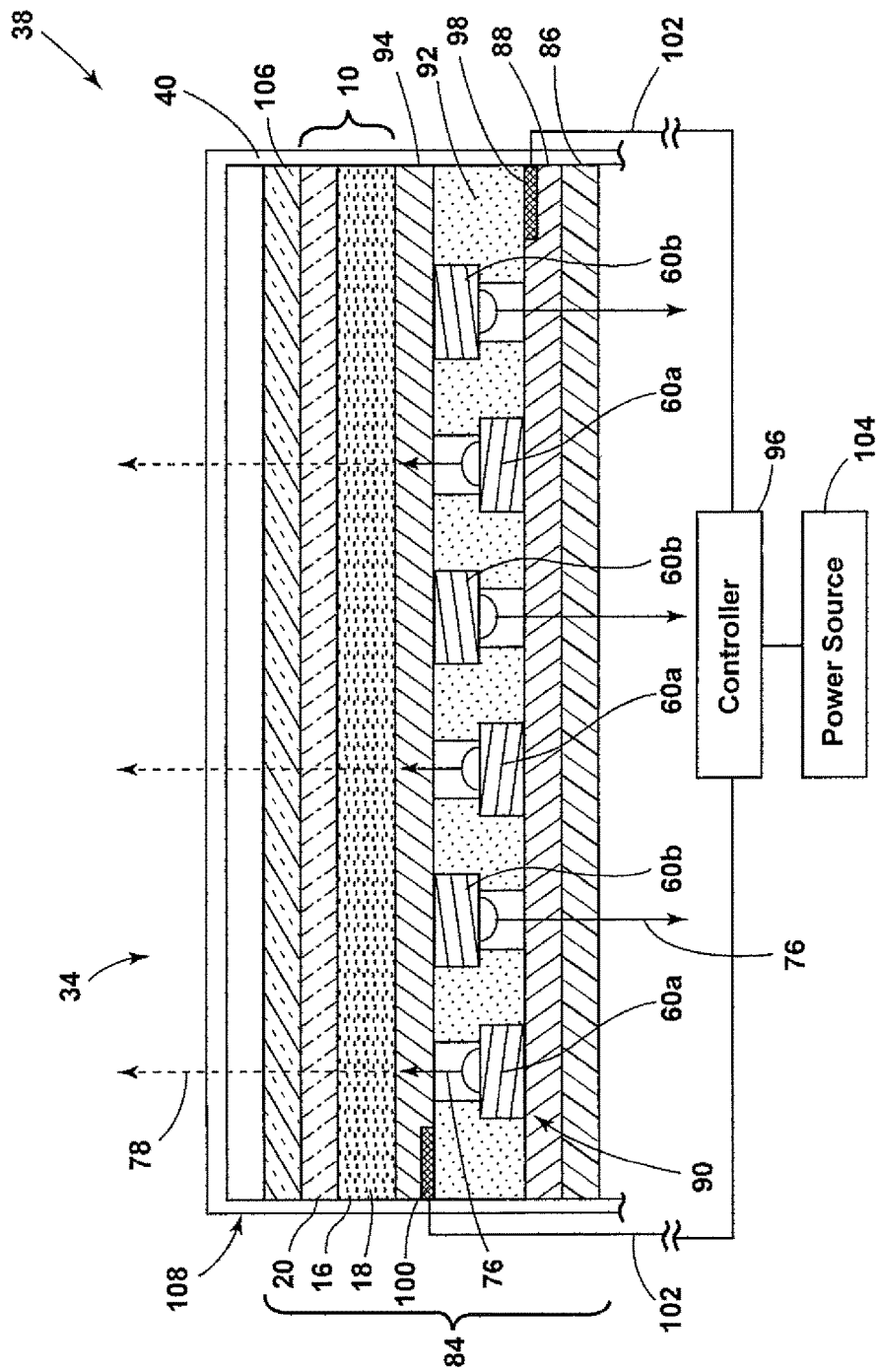
FIG. 11 is a cross-sectional view taken along line XI-XI of FIG. 8 illustrating the light source configured as a light-producing assembly, according to one embodiment.

Referring to FIG. 11, a cross-sectional view of the light source 38 taken along the line XI-XI of FIG. 8 is shown in which the first and second plurality of LED sources 60*a*, 60*b* is integrally formed into a light-producing assembly 84, according to one embodiment. While the light-producing assembly 84 is shown in a planar configuration, it should be appreciated that non-planar configurations are possible in instances where it is desired to place the light-producing assembly 84 in a curved orientation.

With respect to the illustrated embodiment, the light-producing assembly 84 includes a substrate 86, which may include a substantially transparent, or translucent, polycarbonate, poly-methyl methacrylate (PMMA), or polyethylene terephthalate (PET) material on the order of 0.005 to 0.060 inches thick. A positive electrode 88 is arranged over the substrate 86 and includes a substantially transparent conductive material such as, but not limited to, indium tin oxide. The positive electrode 88 is electrically connected to a printed light emitting diode (LED) arrangement 90 that is arranged within a semiconductor ink 92 and applied over the positive electrode 88. Likewise, a substantially transparent negative electrode 94 is also electrically connected to the printed LED arrangement 90. The negative electrode 94 is arranged over the semiconductor ink 92 and includes a transparent or translucent conductive material such as, but not limited to, indium tin oxide. In alternative embodiments, the positive and negative electrodes 88, 94 may swap positions within the light-producing assembly 84 if desired. Each of the positive and negative electrodes 88, 94 are electrically connected to a controller 96 via a corresponding bus bar 98, 100 connected to one of the conductive leads 102. The bus bars 98, 100 may be printed along opposite edges of the positive and negative electrodes 88, 94 and the points of connection between the bus bars 98, 100 and the conductive leads 102 may be at opposite corners of each bus bar 98, 100 to promote uniform current distribution along the bus bars 98, 100. The controller 96 may also be electrically connected to a power source 104, which may correspond to a vehicular power source operating at 12 to 16 VDC.

The printed LED arrangement 90 may be dispersed in a random or controlled fashion within the semiconductor ink 92. In the presently illustrated embodiment, the printed LED arrangement 90 includes a first plurality of LED sources 60*a* biased to direct light towards the viewable portion 34 and a second plurality of LED sources 60*b* biased to direct light into the cavity 54. The LED sources 60*a*, 60*b* may correspond to micro-LEDs of gallium nitride elements on the order of 5 to 400 microns in size and the semiconductor ink 92 may include various binders and dielectric material including, but not limited to, one or more of gallium, indium, silicon carbide, phosphorous, and/or translucent polymeric binders.

Given the small sizing of the printed LED sources 60*a*, 60*b*, a relatively high density may be used to create substantially uniform illumination. The semiconductor ink 92 can be applied through various printing processes, including ink jet and silk screen processes to selected portion(s) of the positive electrode 88. More specifically, it is envisioned that the LED sources 60*a*, 60*b* are dispersed within the semiconductor ink 92, and shaped and sized such that they align with the positive and negative electrodes 88, 94 during deposition of the semiconductor ink 92. The portion of the LED sources 60*a*, 60*b* that ultimately are electrically connected to the positive and negative electrodes 88, 94 may be selectively activated and deactivated by the controller 96. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 11, the light-producing assembly 84 further includes a photoluminescent structure 10 arranged over the negative electrode 94 as a coating, layer, film or other suitable deposition. As described above, the photoluminescent structure 10 may be arranged as a multi-layered structure including an energy conversion layer 16, an optional stability layer 20, and/or an optional protective layer 22. In some embodiments, a decorative layer 106 may be disposed between the viewable portion 34 and the light-producing assembly 84. The decorative layer 106 may include a polymeric material, film, and/or other suitable material that is configured to control or modify an appearance of the viewable portion 34. For example, the decorative layer 106 may be configured to confer a metallic appearance when the light-producing assembly 84 is in an unilluminated state. In other embodiments, the decorative layer 106 may be tinted any color. In any event, the decorative layer 106 should be at least partially light transmissible such that the light-producing assembly 84 is not prevented from illuminating the viewable portion 34.

An overmold material 108 may correspond to the housing 40 and is disposed around the light-producing assembly 84 and/or the first photoluminescent structure 10. The overmold material 108 may protect the light-producing assembly 84 from physical and chemical damage arising from environmental exposure. For example, the overmold material 108 may protect the light-producing assembly 84 from contact with environmental debris.

Figure 12:
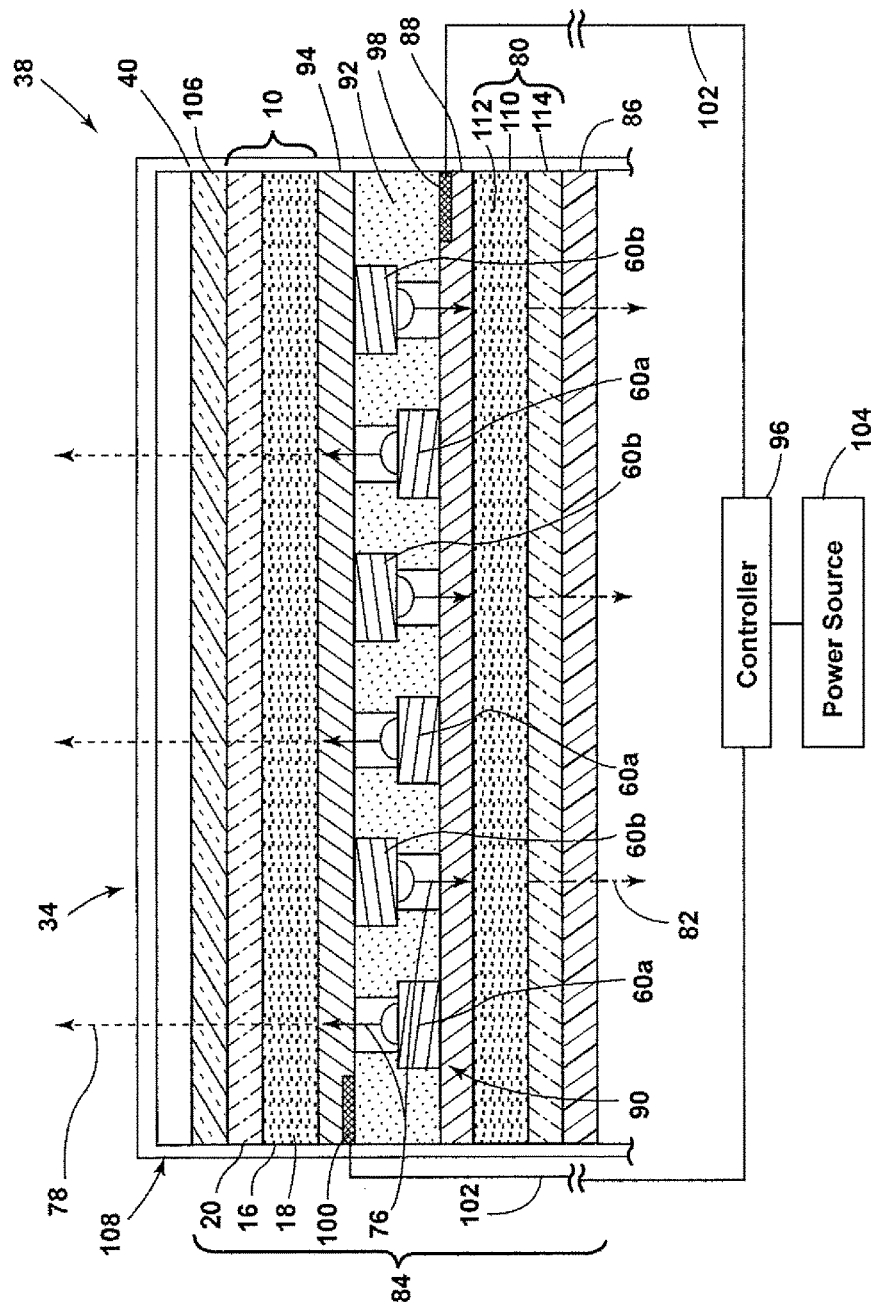
FIG. 12 is a cross-sectional view taken along line XII-XII of FIG. 9 illustrating the light source configured as a light-producing assembly, according to an alternate embodiment.

Referring to FIG. 12, a cross section of the light source 38 taken along the line XII-XII of FIG. 9 is shown according to an alternative embodiment. The light-producing assembly 84 is arranged in the same manner as that shown in FIG. 11, except that the second photoluminescent structure 80 is arranged between the substrate 86 and the positive electrode 88. The second photoluminescent structure 80 may be similarly configured as the first photoluminescent structure 10 and includes an energy conversion layer 110 that includes at least one photoluminescent material 112 having energy converting elements with phosphorescent or fluorescent properties. The second photoluminescent structure 80 may also optionally include a stability layer 114 as described herein.

According to one embodiment, the photoluminescent structures 10, 80 described herein are each configured to luminesce in response to light excitation. With respect to the badge 24 shown in FIG. 12, the first photoluminescent structure 10 is excited by the excitation light 76 emitted by the first plurality of LED sources 60a. In response, the first photoluminescent structure 10 luminesces, thereby illuminating the viewable portion 34. In contrast, excitation light 76 emitted by the second plurality of LED sources 60b is transmitted through the second photoluminescent structure 80 and directed into the cavity 54.

In operation, excitation light 76 emitted by the first and second plurality of LED sources 60a, 60b undergoes an energy conversion where the excitation light 76 is converted by the corresponding photoluminescent material 18, 112 and re-emitted therefrom as converted light 78 at a different wavelength. In alternative embodiments, the energy conversion layer 16, 110 may include more than one distinct photoluminescent material 18, 1112 each configured to convert excitation light 76 into a longer or shorter wavelength converted light 78, 82. In one embodiment, the distinct photoluminescent materials 18, 112 may be interspersed within the energy conversion layers 16, 110.

Alternatively, the distinct photoluminescent materials 18, 112 may be isolated from each other if desired. For example, the distinct photoluminescent materials 18, 112 may be arranged to alternate in a tessellation or other pattern. In either embodiment, each distinct photoluminescent material 18, 112 may be uniquely excited by a corresponding portion of the LED sources 60a, 60b, which may be variously arranged. In some embodiments, each distinct photoluminescent material 18, 112 may be formulated to have a Stokes shift resulting in the associated converted light 78 having an emission spectrum expressed in a unique color such that the resultant emitted light 74 corresponds to a light mixture of the converted light 78 from each distinct photoluminescent material 18, 112 along with any additional excitation light 76. By mixing the converted light 78 outputted from two or more distinct photoluminescent materials 18, 112, a greater diversity of colors may be expressed that would otherwise be unachievable through the excitation of a single photoluminescent material 18. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which is incorporated herein by reference.

Figure 13:
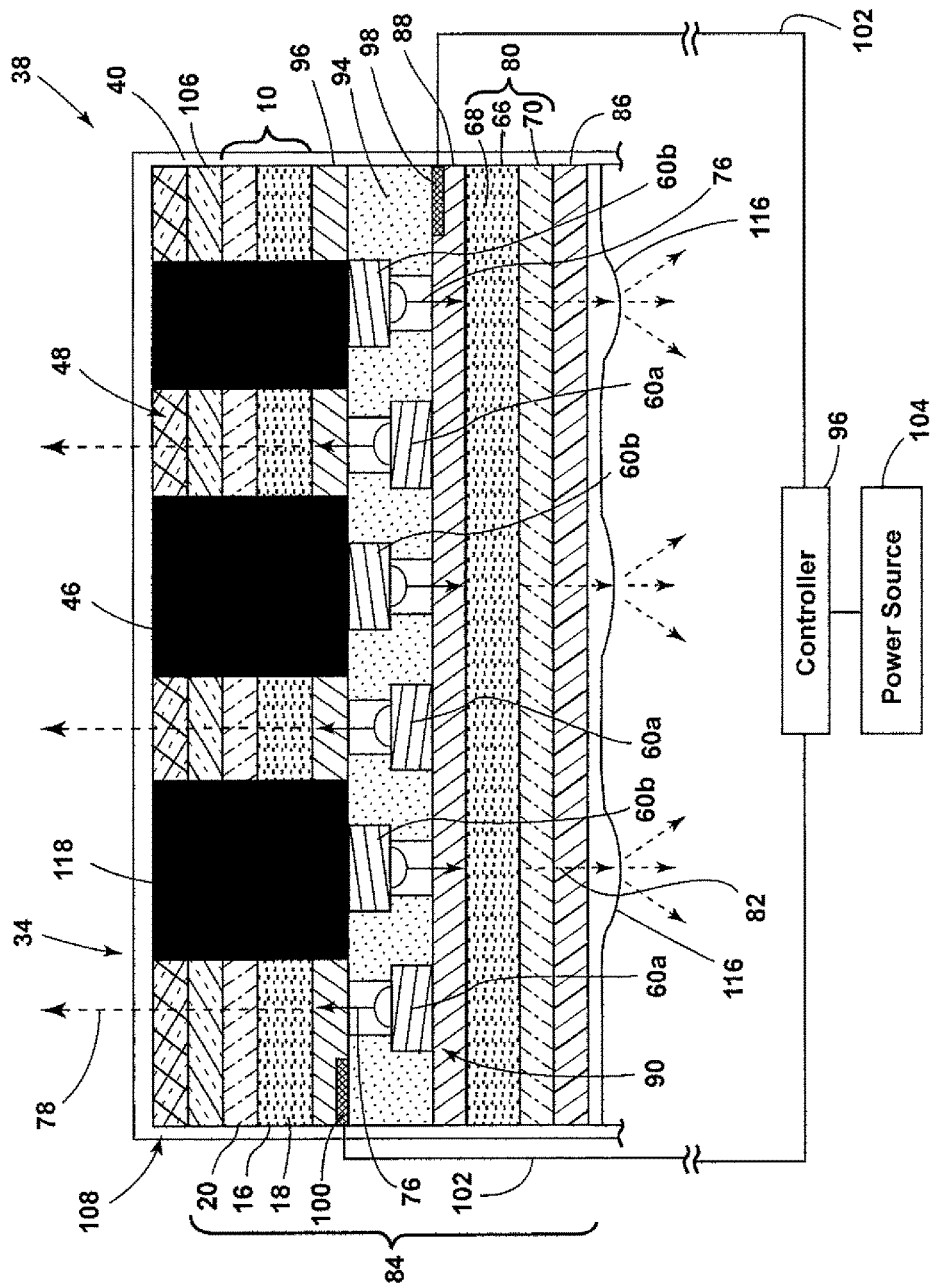
FIG. 13 is a cross-sectional view taken along line XIII-XIII of FIG. 10 illustrating the light source configured as a light-producing assembly having indicia disposed there above, according to one embodiment.

Referring to FIG. 13, a cross section of the light source 38 taken along line XIII-XIII of FIG. 10 is shown. The light-producing assembly 84 is arranged in the same manner as that shown in FIG. 11, except that the first photoluminescent structure 10 may be applied to only a portion of the light-producing assembly 84 to correspond to the indicia 48. Between the first photoluminescent structures 10 may be opaque portions 118 that form the background region 46 and prevent converted light 78 emitted from the first plurality of LED sources 60a to pass therethrough. Alternatively, the opaque portions 118 may correlate to the indicia 48 on the viewable portion 34.

The light-producing assembly 84 may also include optics 116 that are configured to direct excitation light 76 and/or converted light 78 towards a pre-defined location. For example, excitation light 76 and/or converted light 78 may be directed, or focused, towards a desired feature (e.g., the reflective member 64).

Figure 14:
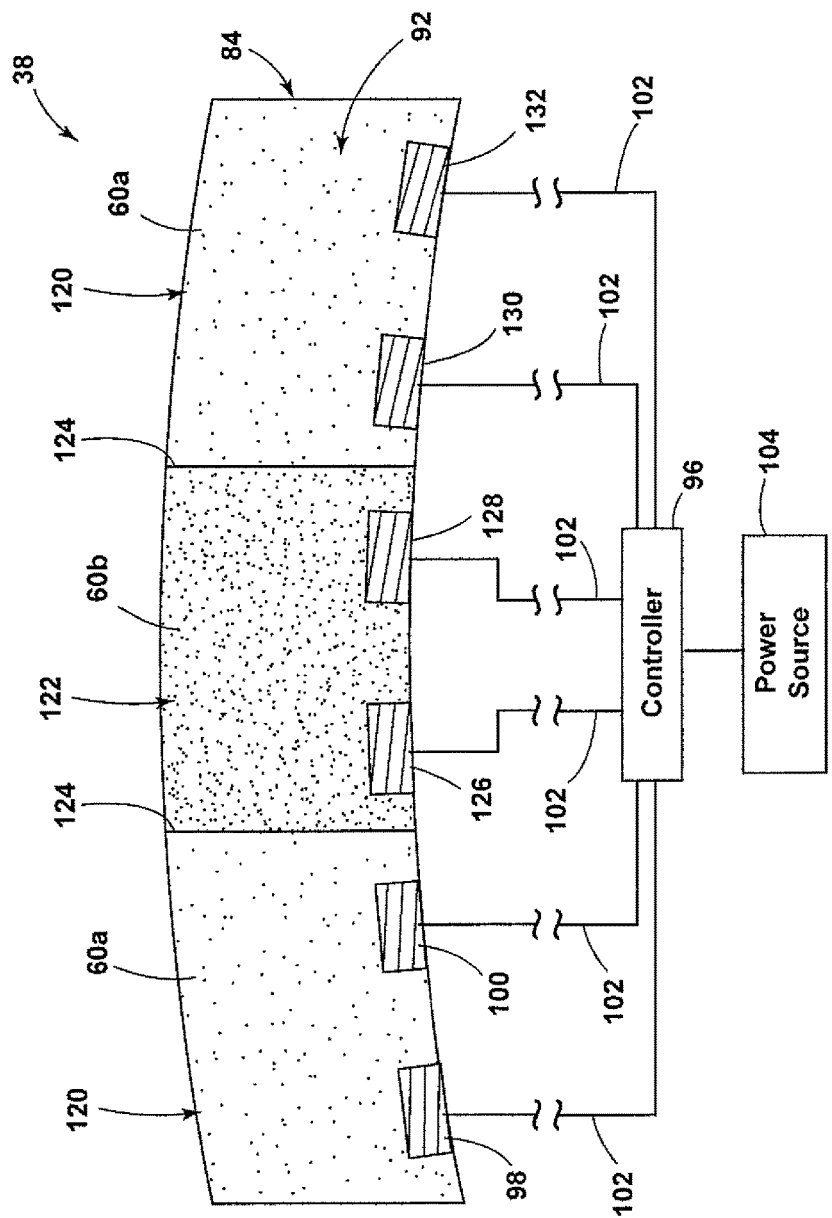
FIG. 14 is a top view of a light-producing assembly, according to one embodiment, having varying types and concentrations of LED sources transversely along the light-producing assembly.

Referring to FIG. 14, the light-producing assembly 84, according to one embodiment, is illustrated from a top view having varying types and concentrations of LED sources 60a, 60b transversely along the light-producing assembly 84. As illustrated, a first portion 120 of the light-producing assembly 84 includes LED sources 60a and a second portion 122 includes LED sources 60b. The first and second portions 120, 122 of the light-producing assembly 84 may be separated by insulative, or non-conductive, barriers 124 from proximately disposed portions through any means known in the art such that each portion 120, 122 may be illuminated independently of any other portion 120, 122. Further, each portion 120, 122 disposed within the light-producing assembly 84 may include a respective bus bar 98, 100, 126, 128, 130, 132 coupled to the controller 96 and configured to electronically energize and then illuminate each respective portion 120, 122.

The LED sources 60a, 60b within each portion 120, 122 may all be orientated in the same direction and/or in opposing directions, as described herein. It should be appreciated that the light-producing assembly 84 may include any number of portions having varying LED sources 60a, 60b that may illuminate in any desired color. Moreover, it should be appreciated that the portions having varied LED sources 60a, 60b may be orientated in any practicable manner and need not be disposed adjacently.

With further reference to FIG. 14, the semiconductor ink 92 may also contain various concentrations of LED sources 60a, 60b such that the density of the LED sources 60a, 60b, or number of LED sources 60a, 60b per unit area, may be adjusted for various lighting applications. In some embodiments, the density of LED sources 60a, 60b may vary across the length of the light-producing assembly 84. For example, a first portion 120 of the light-producing assembly 84 may have a greater density of LED sources 60a, 60b than alternate portions 122, or vice versa.

Figure 15:
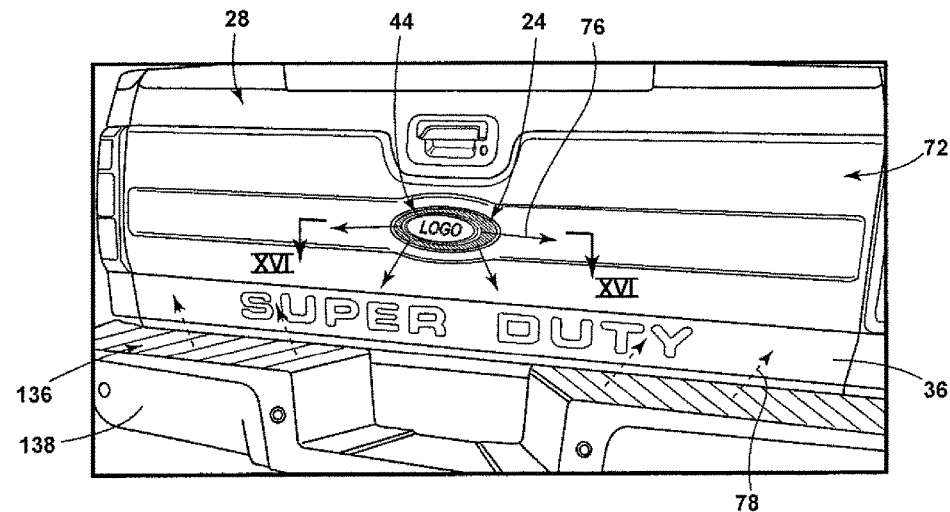
FIG. 15 is a partial rear perspective view of the tailgate having the badge attached thereto and exciting an additional photoluminescent structure disposed on a bumper of the vehicle.

Referring to FIG. 15, an additional photoluminescent structure 136 may be disposed on a component of the vehicle proximately disposed to the badge 24. For example, the additional photoluminescent structure 136 may be disposed on a bumper 138 of the vehicle 28. Excitation light 76 emitted from the light source 38 may excite the additional photoluminescent structure 136 such that the bumper 138 may be illuminated for any desired reason. Likewise, any other component proximate the badge 24 may additionally, or alternatively, be illuminated.

Figure 16:
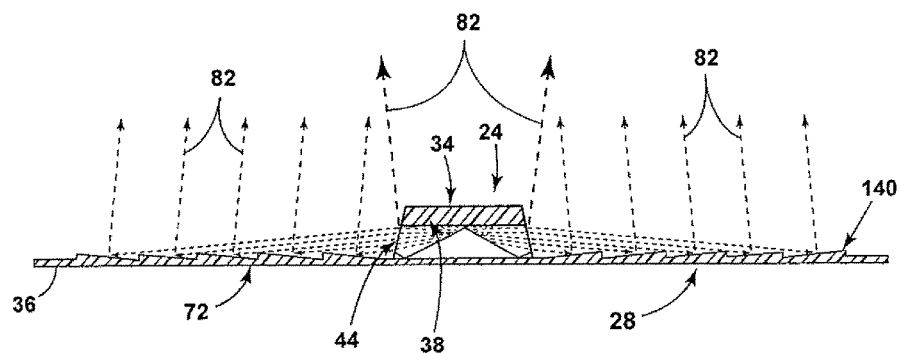
FIG. 16 is a cross section of the badge and tailgate taken along line XVI-XVI of FIG. 15 illustrating a textured tailgate for reflecting light emitted from the badge.

Referring to FIG. 16, the panel 72 of the vehicle 28 may have a surface geometry that is configured to better reflect converted light 82 emitted from the badge 24. For example, the panel 72 may have a stepped configuration 140 such that the converted light 82 may be directed in a desired direction. The surface of the panel 72 may be fabricated to include any desired embossing feature, such as a corrugated pattern on a reflective panel 72 to help direct the converted light 82 in a desired direction.

Figure 17:
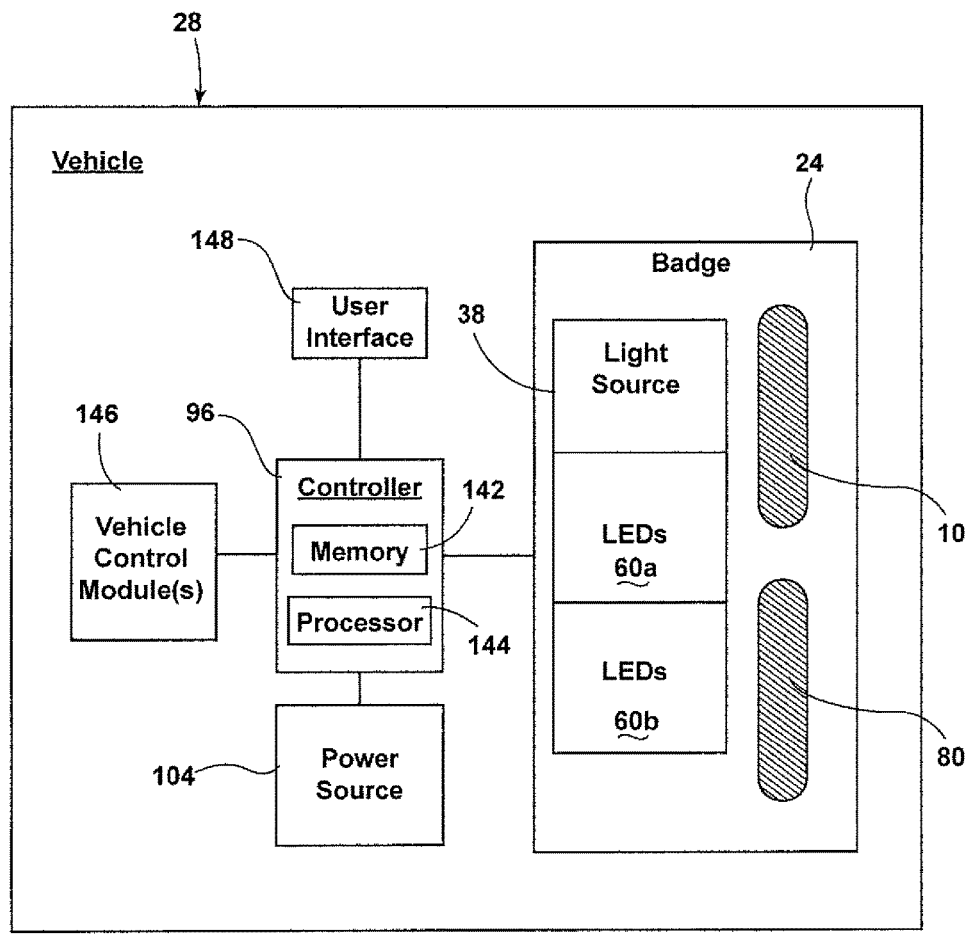
FIG. 17 is a block diagram of the vehicle and the badge.

Referring to FIG. 17, a block diagram of a vehicle 28 is shown in which the badge 24 is implemented. The badge 24 includes a controller 96 in communication with the light source 38. The controller 96 may include memory 142 having instructions contained therein that are executed by a processor 144 of the controller 96. The controller 96 may provide electrical power to the light source 38, or to a respective bus bar 98, 100, via a power source 104 located onboard the vehicle 28. In addition, the controller 96 may be configured to control the excitation light 76 output from each light source 38 based on feedback received from one or more vehicle control modules 146 such as, but not limited to, a body control module, engine control module, steering control module, brake control module, the like, and/or a combination thereof. By controlling the excitation light 76 output of the light source 38, the badge 24 may illuminate in a variety of colors and/or patterns to provide an aesthetic appearance, or may provide vehicle information to an intended observer. For example, when a vehicle braking system is initiated, the peripheral portion 44 may illuminate in a desired color (e.g., red) and/or features disposed proximately to the badge 24 may be illuminated. Additionally, when the vehicle running lamps are initiated, the viewable portion 34 may illuminate. In some embodiments, any portion of the badge 24 may emit converted light 78 as part of a welcome and/or farewell sequence meaning that the illumination may occur as an occupant of the vehicle 28 leaves and/or approaches the vehicle 28 employing the badge 24. It is contemplated that the badge 24 may have a wide range of target locations such that the badge 24 may be used for a plurality of functions.

In another embodiment, the badge 24 may include a user interface 148. The user interface 148 may be configured such that a user may control the wavelength of excitation light 76 that is emitted by the light source 38. Such a configuration may allow a user to control which features are illuminated. The user interface 148 may be disposed within the vehicle 28 cabin or on any surface that is accessible to the user during utilization of the badge 24 described herein. The user interface 148 may use any type of control known in the art to control the light source 38, such as, but not limited to, proximity sensors.

With respect to the above examples, the controller 96 may modify the intensity of the emitted first and second wavelengths of light by pulse-width modulation or current control. In some embodiments, the controller 96 may be configured to adjust a color of the emitted light by sending control signals to adjust an intensity or energy output level of the light source 38. For example, if the light source 38 is configured to output the first emission at a low level, substantially all of the excitation light 76 may become visible, converted light 78. If the light source 38 is configured to emit excitation light 76 at a high level, only a portion of the excitation light 76 may become converted light 78 by the photoluminescent structure 10, 80.

Though a low level and a high level of intensity are discussed in reference to the excitation light 76, it shall be understood that the intensity of the excitation light 76 may be varied among a variety of intensity levels to adjust a hue of the color corresponding to the emitted light 74 from the badge 24. As described herein, the color of the emitted light 74 may be significantly dependent on the particular photoluminescent materials 18, 112 utilized in the photoluminescent structure 10, 80. Additionally, a conversion capacity of the photoluminescent structure 10, 80 may be significantly dependent on a concentration of the photoluminescent materials 18, 112 utilized in the photoluminescent structure 10, 80. By adjusting the range of intensities that may be emitted from the light source 38, the concentration and proportions of the photoluminescent materials 18, 112 in the photoluminescent structure 10, 80 and the types of photoluminescent materials 18, 112 utilized in the photoluminescent structure 10, 80 discussed herein may be operable to generate a range of color hues of emitted light 74 by blending the excitation light 76 with the converted light 78.

Accordingly, an illuminated badge has been advantageously described herein. The badge may provide various benefits including a simple and cost-effective means to produce a variety of illumination patterns that may be used as a styling feature and/or to assist an occupant in the usage of the vehicle.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a body panel;
   a badge attached to the panel and including a substrate and a housing attached thereto and defining a cavity therebetween;
   a reflective member disposed within the cavity; and
   a light source within the cavity configured to emit an excitation light in a first direction to illuminate a viewable portion of the badge and in a second direction towards the reflective member, wherein the reflective member redirects the excitation light through a peripheral portion of the badge.

2. The vehicle of claim 1, wherein the light source comprises a plurality of printed LEDs.

3. The vehicle of claim 1, further comprising:
   a first photoluminescent structure disposed within the cavity configured to convert the excitation light emitted from the light source into a converted light of a different wavelength, wherein the converted light exits the badge through the viewable portion.

4. The vehicle of claim 3, further comprising:
a second photoluminescent structure disposed within the cavity configured to convert the excitation light emitted from the light source into a second converted light of a different wavelength, wherein the second converted light exits the badge through the peripheral portion.

5. The vehicle of claim 4, wherein the first photoluminescent structure and the second photoluminescent structure each include at least one photoluminescent material therein configured to down convert an excitation light received from at least a portion of the light sources into a visible converted light.

6. The vehicle of claim 1, wherein the excitation light emitted through the peripheral portion is directed towards the panel.

7. The vehicle of claim 6, wherein the panel has a non-planar surface geometry for directing light emitted from the badge towards a desired location.

8. A badge, comprising:
a housing attached to a substrate forming a cavity between the housing and substrate;
a light source disposed within the cavity configured to emit an excitation light in a first direction to illuminate a viewable portion and in a second direction towards a reflective member disposed within the cavity, wherein the reflective member redirects the excitation light through a peripheral portion of the badge; and
a first photoluminescent structure disposed between the light source and housing.

9. The badge of claim 8, wherein the light transmissive portion correlates with the peripheral portion.

10. The badge of claim 8, wherein the light source comprises a plurality of printed LEDs.

11. The badge of claim 8, wherein the first photoluminescent structure comprises at least one photoluminescent material configured to down convert the excitation light received from at least a portion of the light source into a visible, converted light that is outputted from the housing or substrate.

12. The badge of claim 11, wherein the excitation light comprises at least one of blue light, violet light, and UV light.

13. The badge of claim 8, wherein the first photoluminescent structure is disposed on an inner surface of the peripheral portion.

14. The badge of claim 13, further comprising:
a second photoluminescent structure disposed between the light source and the viewable portion, wherein the light source is configured to illuminate the first photoluminescent structure and the second photoluminescent structure independently.

15. A vehicle badge, comprising:
a rear portion, a peripheral portion, and a viewable front portion;
a light-producing assembly disposed within the peripheral portion and configured to emit an excitation light in two opposing directions;
a first photoluminescent structure disposed over a portion of the light-producing assembly; and
a second photoluminescent structure configured to convert the excitation light emitted from the light-producing assembly to a converted light that exists through the peripheral portion.

16. The vehicle badge of claim 15, wherein the light-producing assembly includes a plurality of printed LEDs configured to emit excitation light at a first wavelength.

17. The vehicle badge of claim 16, wherein the first photoluminescent structure includes at least one photoluminescent material configured to down convert an excitation light received from at least a portion of the light-producing assembly into a visible, converted light that is emitted through the peripheral portion.

18. The vehicle badge of claim 16, wherein the first photoluminescent structure is configured to convert an excitation light received from at least a portion of the light-producing assembly into a visible, converted light of a different wavelength that is emitted through the viewable portion.

19. The vehicle badge of claim 15, wherein the excitation light comprises one of blue light, violet light, and UV light.

* * * * *